United States Patent
Yoo et al.

(10) Patent No.: US 12,303,933 B2
(45) Date of Patent: May 20, 2025

(54) GRAPHENE-COATED STEEL SHEET AND METHOD FOR PRODUCING SAME

(71) Applicant: POSCO, Pohang-si (KR)

(72) Inventors: Hye-Jin Yoo, Gwangyang-si (KR); Jung-Su Kim, Gwangyang-si (KR); Je-Hoon Baek, Gwangyang-si (KR); Chang-Se Byeon, Gwangyang-si (KR)

(73) Assignee: POSCO, Pohang-si (KR)

( * ) Notice: Subject to any disclaimer, the term of this patent is extended or adjusted under 35 U.S.C. 154(b) by 119 days.

(21) Appl. No.: 17/781,921

(22) PCT Filed: Oct. 20, 2020

(86) PCT No.: PCT/KR2020/014340
§ 371 (c)(1),
(2) Date: Jun. 2, 2022

(87) PCT Pub. No.: WO2021/112399
PCT Pub. Date: Jun. 10, 2021

(65) Prior Publication Data
US 2023/0001445 A1    Jan. 5, 2023

(30) Foreign Application Priority Data
Dec. 5, 2019  (KR) .......... 10-2019-0160826

(51) Int. Cl.
*B05D 1/18* (2006.01)
*B05D 3/04* (2006.01)
(Continued)

(52) U.S. Cl.
CPC ............ *B05D 1/185* (2013.01); *B05D 3/044* (2013.01); *B05D 3/06* (2013.01); *B05D 3/062* (2013.01); *B05D 7/50* (2013.01); *C23C 28/345* (2013.01)

(58) Field of Classification Search
None
See application file for complete search history.

(56) References Cited

U.S. PATENT DOCUMENTS

2009/0058258 A1*  3/2009  Chang ............... H01J 29/864
                                                                                          313/497
2015/0329741 A1   11/2015  Yoo et al.
(Continued)

FOREIGN PATENT DOCUMENTS

CN     104884383 A    9/2015
CN     106784915 A    5/2017
(Continued)

OTHER PUBLICATIONS

Machine Translation of KR 20140083813 A (Year: 2014).*
(Continued)

*Primary Examiner* — Binh X Tran
*Assistant Examiner* — Bradford M Gates
(74) *Attorney, Agent, or Firm* — Morgan, Lewis & Bockius LLP

(57) ABSTRACT

The present invention pertains to a method for producing a graphene-coated steel sheet, the method comprising the steps of: modifying the surface of the steel sheet so that the surface is negatively charged; forming a positively-charged first graphene oxide layer on the surface-modified steel sheet; forming a negatively-charged second graphene oxide layer on the first graphene oxide layer; and heat-treating the steel sheet on which the first and second graphene oxide layers are formed. The present invention provides a graphene coating method which can be easily applied to large-area coating through a simple process without a special dispersant or binder, and has the effect of allowing the excellent physical properties of graphene to be more efficiently exhibited.

14 Claims, 6 Drawing Sheets

(51) Int. Cl.
*B05D 3/06* (2006.01)
*B05D 7/00* (2006.01)
*C23C 28/00* (2006.01)

(56) References Cited

U.S. PATENT DOCUMENTS

| | | | | |
|---|---|---|---|---|
| 2017/0341034 A1* | 11/2017 | Dave | ............... | B32B 27/302 |
| 2018/0007799 A1* | 1/2018 | Jeong | ............... | H05K 1/02 |
| 2018/0076404 A1* | 3/2018 | Cho | ............... | H10K 71/60 |
| 2021/0104672 A1* | 4/2021 | Shin | ............... | C09D 7/63 |

FOREIGN PATENT DOCUMENTS

| | | |
|---|---|---|
| EP | 2639329 A2 | 9/2013 |
| JP | 2011-510905 A | 4/2011 |
| KR | 10-2011-0016287 A | 2/2011 |
| KR | 10-2011-0115539 A | 10/2011 |
| KR | 10-2013-0133373 A | 12/2013 |
| KR | 10-2014-0080928 A | 7/2014 |
| KR | 10-2014-083813 A | 7/2014 |
| KR | 10-1482327 B1 | 1/2015 |
| KR | 10-2015-0049279 A | 5/2015 |
| KR | 10-1714847 B1 | 3/2017 |
| KR | 10-1819302 B1 | 1/2018 |
| KR | 10-1911745 B1 | 10/2018 |
| KR | 10-1989017 B1 | 6/2019 |
| WO | 2009/123771 A2 | 10/2009 |
| WO | 2019/089708 A1 | 5/2019 |

OTHER PUBLICATIONS

The extended European Search Report dated May 24, 2023 issued in European Patent Application No. 20896493.2.
Chinese Office Action dated Nov. 3, 2022 issued in Chinese Patent Application No. 202080084267.7.
Jiwoong Heo et al., "Facile Surface Modification of Polyethylene Film via Spray-Assisted Layer-by-Layer Self-Assembly of Graphene Oxide for Oxgen Barrier Properties," pp. 1-7, Scientific Reports( Feb. 26, 2019).
Hwang et al., "Highly Tunable Charge Transport in Layer-by-Layer Assembled Graphene Transistors," pp. 2432-2440, ACS NANO, vol. 6, No. 3 (Feb. 7, 2012).
International Search Report dated Apr. 13, 2021 issued in International Patent Application No. PCT/KR2020/014340 (with English translation).

* cited by examiner

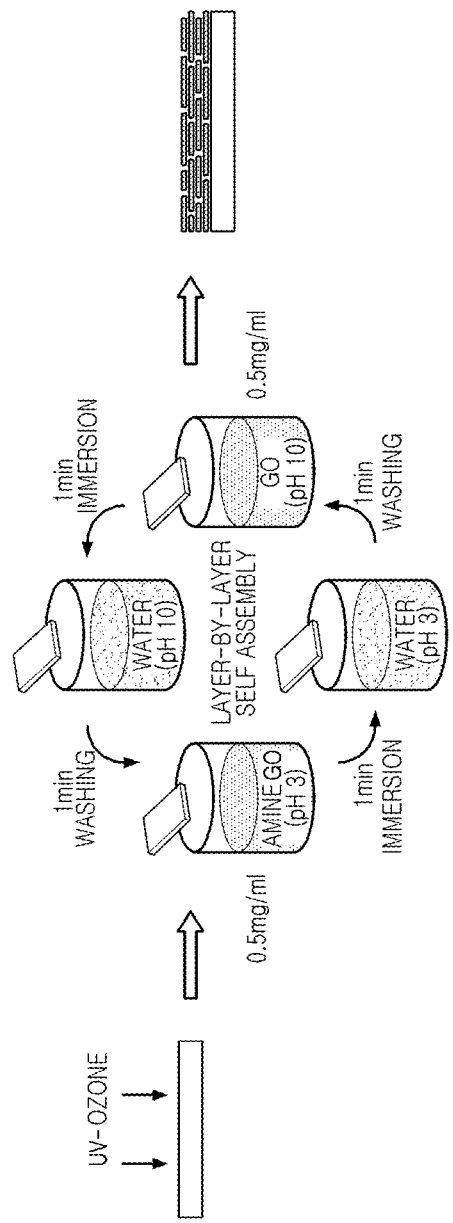
[FIG. 1]

[FIG. 2]
(a)
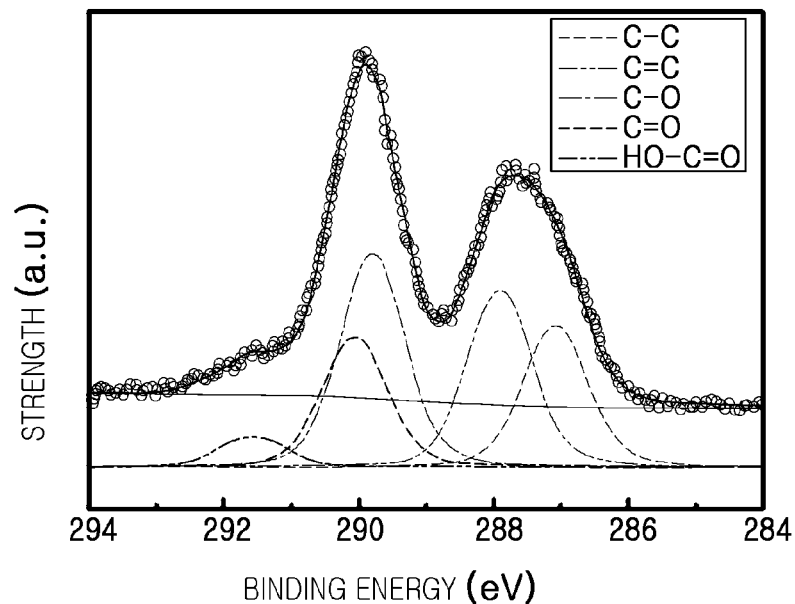
(b)
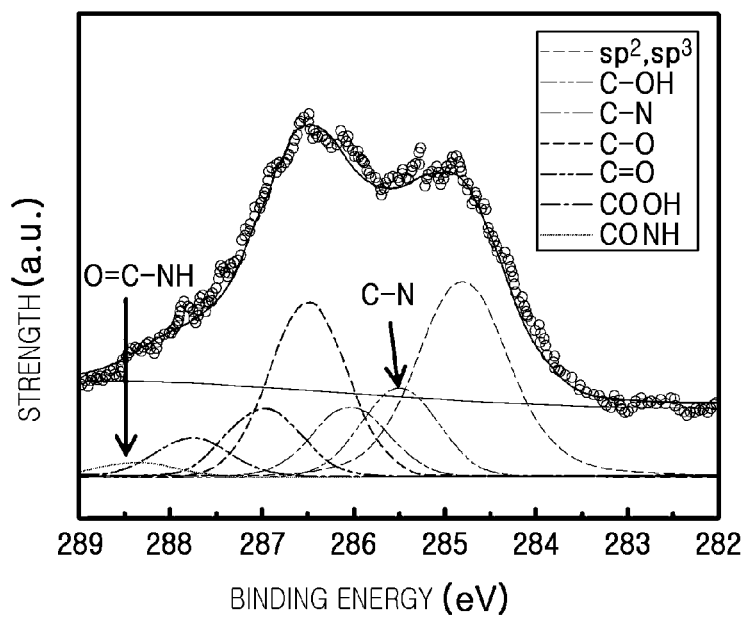

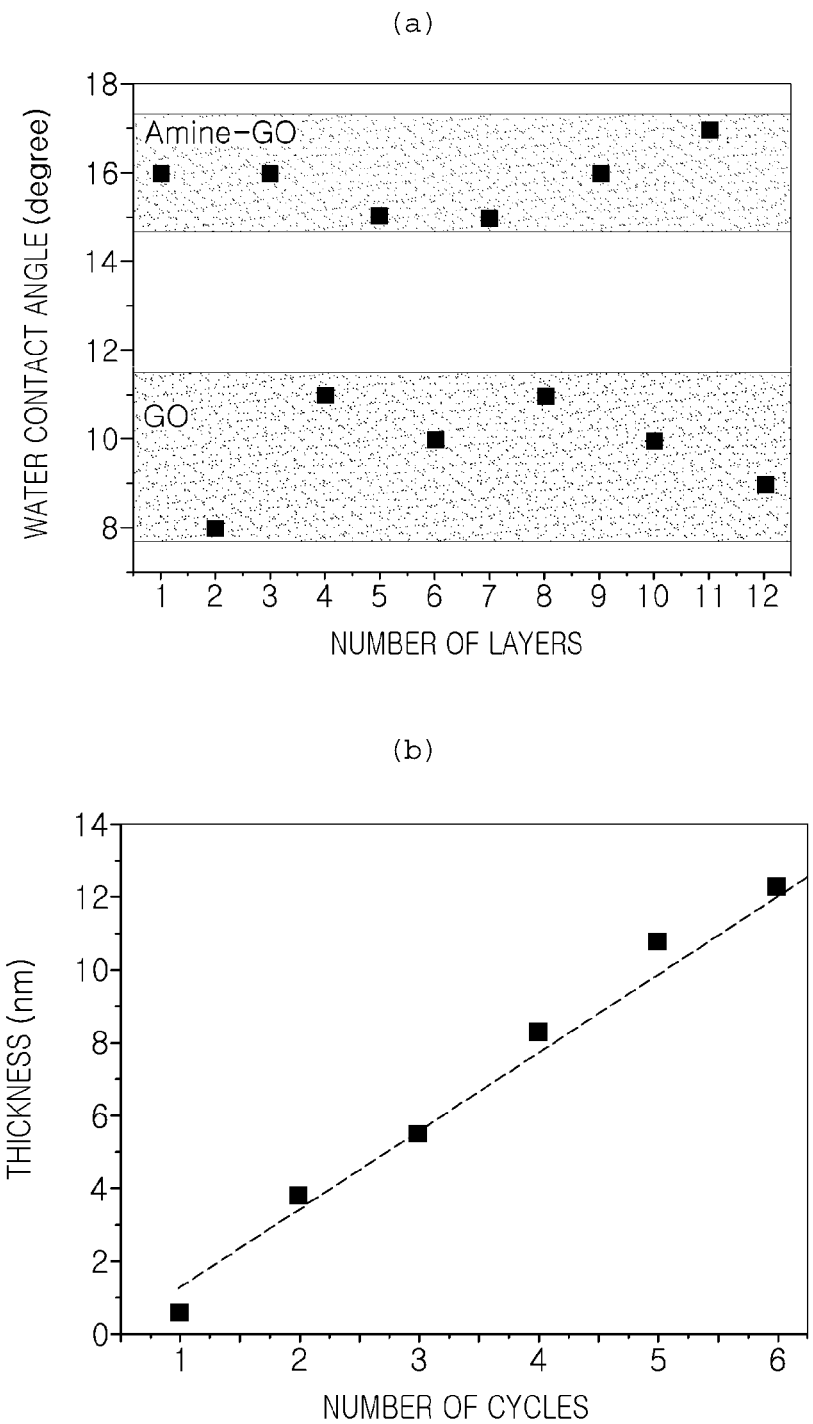
[FIG. 3]

[FIG. 4]
(a)
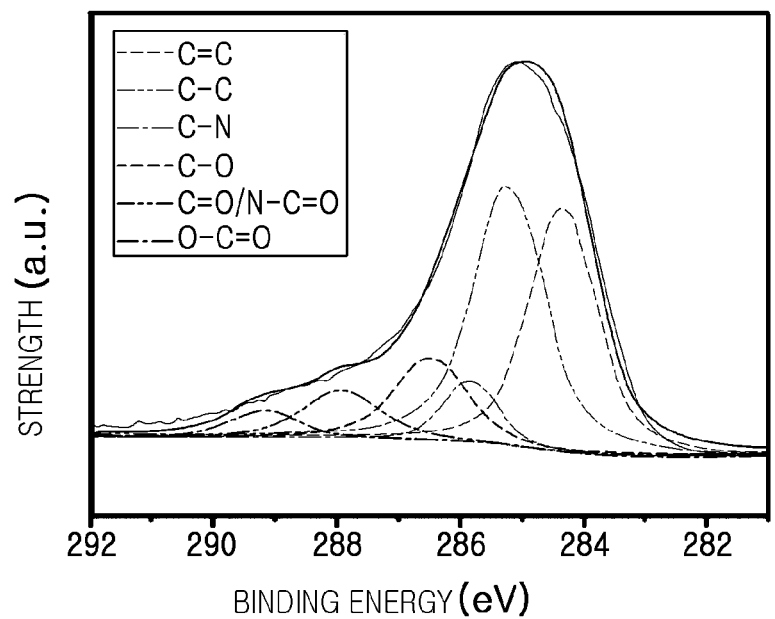
(b)
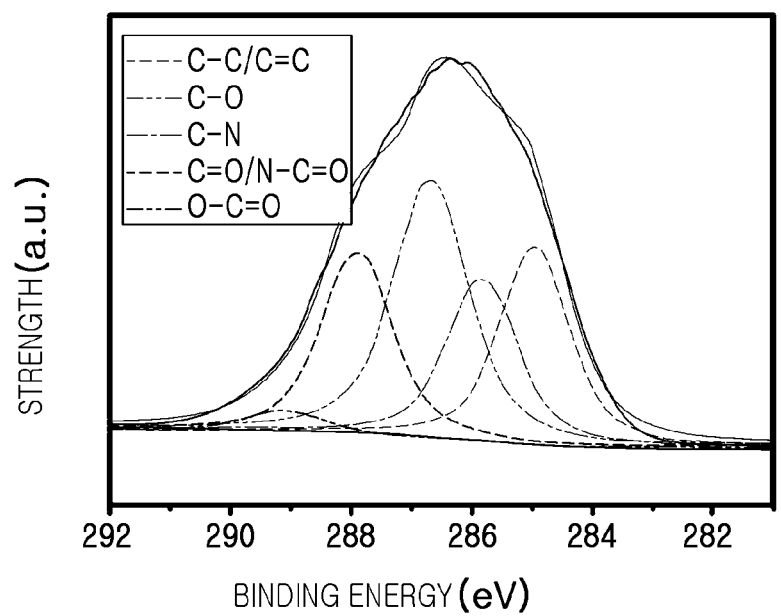

[FIG. 5]
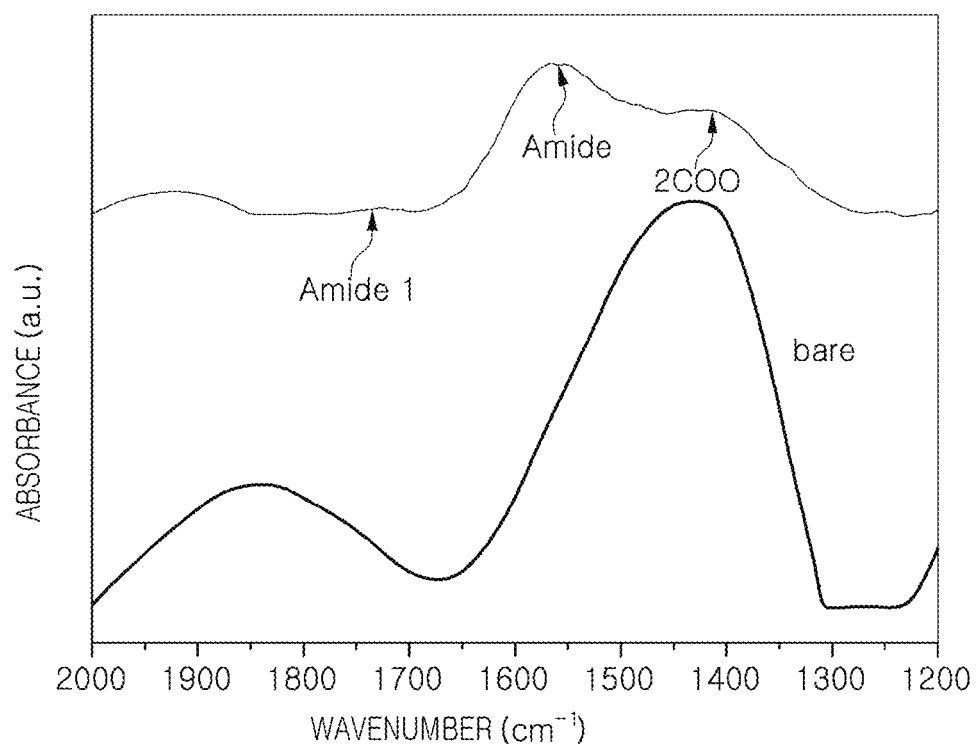

[FIG. 6]
(a)
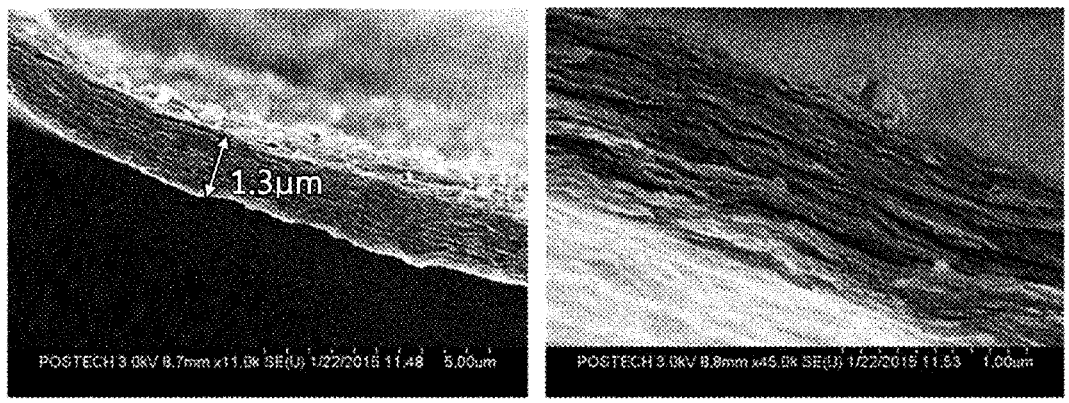
(b)
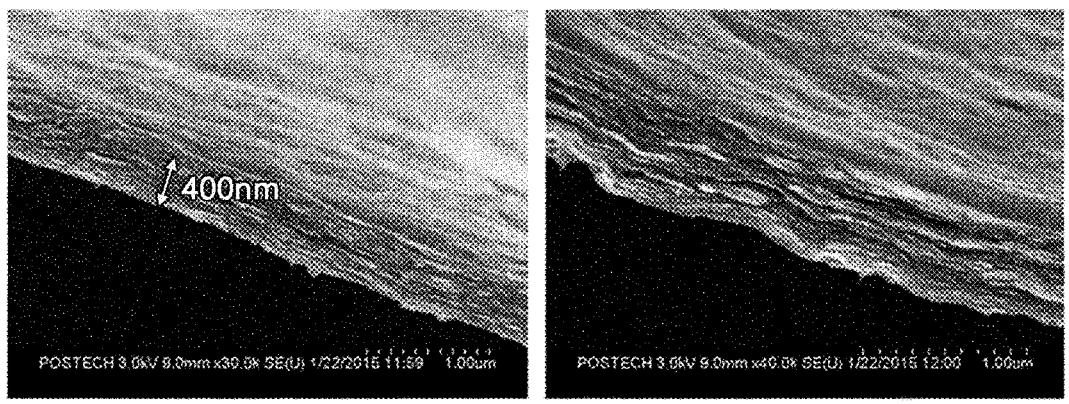

GRAPHENE-COATED STEEL SHEET AND METHOD FOR PRODUCING SAME

CROSS-REFERENCE OF RELATED APPLICATIONS

This application is the U.S. National Phase under 35 U.S.C. § 371 of International Patent Application No. PCT/KR2020/014340, filed on Oct. 20, 2020, which in turn claims the benefit of Korean Application No. 10-2019-0160826, filed on Dec. 5, 2019, the entire disclosures of which applications are incorporated by reference herein.

TECHNICAL FIELD

The present disclosure relates to a graphene-coated steel sheet and a method for manufacturing the same, more particularly, a method for manufacturing a graphene-coated steel sheet applicable to large-area coating and having improved orientation.

BACKGROUND ART

Graphene is a two-dimensional carbon monolayer in which carbon atoms are arranged in a hexagonal lattice, and has emerged as a promising novel nanomaterial having remarkable electrical, chemical and mechanical properties. Graphene may influence the development of quantum devices, nanocomposites and next-generation ultrathin films. Specifically, graphene may have a two-dimensional carbon atomic plane structure in which the carbon atomic layer is present in a hexagonal lattice point plane, and graphene has a tensile strength about 311 times stronger than that of steel, may have electron mobility 1,000 faster than that of silicon, may have thermal conductivity 10 times greater than that of copper, may be transparent enough such that 98% of light may pass therethrough, and may retain properties thereof even when being bent or stretched. Due to these properties, graphene may be widely used in nanomaterials, inks, barrier materials, heat dissipation materials, ultralight materials, energy electrode materials, next-generation semiconductors, transparent electrodes, and the like. It may be expected that, when graphene having such properties is coated on a steel sheet, corrosion resistance, heat dissipation, conductivity, adhesion strength, strength and workability may be secured for a surface of a steel sheet such that the steel sheet may be utilized in various fields.

As a method for coating graphene on a substrate, a process using a graphene solution has been widely used, and in the case of a process using a graphene solution as described above, a binder may be essential to secure adhesion strength force with the substrate, and generally, a mixture of graphene, a binder, and a dispersant may be used. However, in this case, a problem may occur in dispersion stability of graphene in the solution, and the selection of a dispersant not adversely affecting physical properties of the coating composition may be necessary.

Also, when graphene and binder are mixed, the binder and graphene are disposed without a specific directivity, such that, even after coating on the surface of the steel sheet, the binder layer may be disposed in an outer region than the graphene layer, properties of graphene may not be sufficiently exhibited on the surface, which may be problematic.

To allow graphene to be well dispersed in the binder, graphene oxide may be prepared by attaching a functional group to graphene, but the method may have a disadvantage in that a dispersion solution may need to be prepared, coating may be performed using the solution, and a reduction process at high temperature may need to be performed again.

SUMMARY OF INVENTION

Technical Problem

An aspect of the present disclosure is to provide a method for manufacturing graphene-coated steel sheet which may maximize unique properties of graphene without additional additives such as a binder and a dispersant, and a graphene-coated steel sheet manufactured u the method.

Solution to Problem

According to an embodiment of the present disclosure, a method for manufacturing a graphene-coated steel sheet is provided, the method including surface-modifying a steel sheet to have a negative charge; forming a first graphene oxide layer having a positive charge on the surface-modified steel sheet; forming a second graphene oxide layer having a negative charge on the first graphene oxide layer; and heat-treating the steel sheet on which the first and second graphene oxide layers are formed.

The surface-modifying may be performed by at least one method selected from ultraviolet-ozone (UV-Ozone) irradiation, electron beam (EB) irradiation, infrared (IR) irradiation, and near-infrared (NIR) irradiation.

The forming the first graphene oxide layer may be performed using a graphene oxide dispersion solution modified with an amine group.

The graphene oxide dispersion solution modified with an amine group may be prepared by reacting graphene oxide, N-ethyl-N'-(3-dimethylaminopropyl)carbodiimidemethiodide (EDC) and $C_1$ to $C_6$ alkylenediamine in water.

The graphene oxide dispersion solution modified with an amine group may not include a binder and a dispersant.

The forming the second graphene oxide layer may be performed using a graphene oxide dispersion solution treated by at least one method selected from ultraviolet-ozone irradiation, electron beam (EB) irradiation, infrared (IR) irradiation, and near-infrared (NIR) irradiation.

The graphene oxide dispersion solution may not include a binder and a dispersant.

The first and second graphene oxide layers may be laminated through electrostatic interaction.

The first and second graphene oxide layers may have an amide bond.

The forming the first graphene oxide layer and the forming the second graphene oxide layer may be performed two or more times repeatedly.

The heat treatment may be performed in a temperature range of 100 to 400° C.

The method may further include washing using an aqueous solution of pH 1 to 6 after the forming the first graphene oxide layer.

The method may further include washing using an aqueous solution of pH 8 to 14 after the forming the second graphene oxide layer.

According to an embodiment of the present disclosure, a graphene-coated steel sheet manufactured by the above method may be provided.

A thickness of the graphene layer coated on the steel sheet may be 0.1 μm to 5.0 μm.

Advantageous Effects of Invention

According to the present disclosure, a method for coating graphene which may be easily applied to large-area coating through a simplified process without a special dispersant or binder may be provided, and the effect of more efficiently exhibiting excellent physical properties of grapheme may be obtained.

BRIEF DESCRIPTION OF DRAWINGS

FIG. 1 is a diagram illustrating a method for manufacturing a graphene-coated steel sheet according to an embodiment of the present disclosure;

FIG. 2A is a result of XPS measurement of graphene oxide according to an embodiment of the present disclosure, and FIG. 2B is a result of XPS measurement of graphene oxide modified with an amine group.

FIG. 3A is a result of measurement of a contact angle of a coating layer formed according to an embodiment of the present disclosure, FIG. 3B is a result of measurement of changes in a thickness of a coating layer depending on a coating layer formation cycle.

FIG. 4A is a result of XPS measurement before heat treatment of a steel sheet on which a graphene coating layer is formed, and FIG. 4B is a result of XPS measurement after the heat treatment.

FIG. 5 is a result of infrared absorption spectroscopy after heat treatment of the graphene-coated steel sheet.

FIG. 6A is an SEM image of a cross-section of a graphene-coated steel sheet before heat treatment, and FIG. 6B is an SEM image of a cross-section of a graphene-coated steel sheet after heat treatment.

BEST MODE FOR INVENTION

Hereinafter, an embodiment of steel material of the present disclosure will be described. Embodiments of the present disclosure may be modified in various other forms, and the scope of the present disclosure is not limited to the embodiments described below.

The present disclosure relates to a graphene-coated steel sheet and a method for manufacturing the same.

Since graphene has a planar structure, graphene may have anisotropy in which properties in the horizontal direction may be excellent, while properties in the vertical direction may be inferior as compared to the properties the horizontal direction. Particularly, to use graphene as an effective anti-gas film and anti-oxidation film, it may be important to arrange graphenes in a horizontal direction to a material to block gas such that graphenes may be tightly attached to the material.

To apply a graphene oxide in solution to a gas barrier film and an anti-oxidation film, the size of a piece (hundreds of nanometers to several μm) of one sheet of graphene oxide may be too small. Therefore, to apply the graphene, a multilayer graphene film in which pieces of graphene oxide are assembled may be formed and applied to a gas barrier film.

However, the degree of assembling graphene oxide may be different depending on a method or conditions for coating graphene oxide, and when a graphene film is not densely formed because the assembling of graphene oxide is not good, gas may penetrate through the graphene oxide and may not exhibit gas barrier properties. Therefore, when graphene oxide is arranged to have orientation and high barrier properties is obtained by reducing the distance between graphenes is reduced, corrosion resistance and also excellent properties such as intrinsic electrical conductivity and heat dissipation properties of graphene may be increased.

To manufacture a coated steel sheet having effective barrier properties, electrical conductivity and heat dissipation properties using graphene oxide, the dispersed graphene fragments may need to be arranged to have orientation and the distance between the graphenes may need to be effectively reduced. Methods of forming a graphene coating layer having such a multilayer structure include dip coating, bar coating, roll coating, and layer-by-layer assembly (LBL assembly).

First, the dip coating method may be a method of coating by immersing a material in a solution in which a material to be applied to a substrate is dissolved such that the material may be adsorbed to the substrate. When the dip coating method is applied to graphene, graphene may be coated easily, but the force of adsorption of graphene to the substrate may be limited, such that it may be difficult to manufacture a multilayer graphene-laminated film, and since a great amount of solution is used, it may be difficult to coat large-area graphene.

Thereafter, the bar coating method may be a method of applying a small amount of a solution to be applied to a portion of the substrate and applying the solution throughout the entire area using a bar. When the bar coating is applied to graphene, a large-area film may be formed using a small amount of solution, and since coating is applied by applying a shear force, a film in which graphenes are well oriented may be manufactured, which may be an advantage. However, due to low viscosity, aggregation between graphene and graphene may be observed while a solvent is evaporated, and accordingly, a binder may need to be added.

The LBL assembly may be a type of dip coating, and may be a method of manufacturing a multilayer film through electrostatic force by dip-coating materials having opposite charges to each other in order. The present inventors found that, since graphene oxide includes a large number of carboxyl groups on the edge of a sheet, graphene oxide may have a negative charge in an aqueous solution, and that, when graphene oxide is modified, graphene oxide may be allow to have a positive charge such that the graphene coating layer may be be prepared by the LBL assembly method through electrostatic attraction, and thus found that, when the graphene coating layer is formed through strong electrostatic attraction, orientation may improve without a binder, and the present disclosure was devised.

Accordingly, according to an aspect of the present disclosure, a method for manufacturing a graphene-coated steel sheet including surface-modifying a steel sheet to have a negative charge; forming a first graphene oxide layer having a positive charge on the surface-modified steel sheet; forming a second graphene oxide layer having a negative charge on the first graphene oxide layer; and heat-treating the steel sheet on which the first and second graphene oxide layers are formed may be provided.

To manufacture a graphene-coated steel sheet by the LBL assembly method, first, the surface-modifying the surface of the steel sheet to have a negative charge may be performed. The surface-modifying method is not limited to any particular example, and for example, one or more methods selected from ultraviolet-ozone (UV-Ozone) irradiation, electron beam (EB) irradiation, infrared (IR) irradiation, and near-infrared (NIR) irradiation on the surface of the steel sheet may be performed.

Thereafter, the forming a first graphene oxide layer having a positive charge on the surface-modified steel sheet having a negative charge may be performed. In this case, the forming the first graphene oxide layer may be performed using a dispersion solution of graphene oxide modified with an amine group, and more specifically, the graphene oxide dispersion solution modified with an amine group may be prepared by reacting graphene oxide, N-ethyl-N'-(3-dimethylaminopropyl) carbodiimidemethiodide (EDC) and $C_1$ to $C_6$ alkylenediamine in water. The $C_1$ to $C_6$ alkylenediamine may be, for example, ethylenediamine.

According to the present disclosure, the graphene oxide dispersion solution modified with an amine group, which may be used for forming the first graphene oxide layer having a positive charge may not include additional additives such as a binder and a dispersant. When a binder is used to secure adhesion strength between the steel sheet and graphene, the graphene may need to be well dispersed in the binder to ensure dispersion stability so as to be used as a coating solution, and thus, to obtain a sufficient dispersion effect, it may be necessary to select an optimal dispersant not adversely affecting physical properties of the coating composition. Also, when graphene is dispersed in a binder, it may be difficult for graphene to be exposed on the surface layer of the steel sheet after coating on the steel sheet, and also, when graphene and binder are simply mixed, the binder and graphene may be arranged without any directivity, such that, even after being coated on the surface of the steel sheet, the binder layer may be disposed in an outer region than the graphene layer, such that properties of graphene may not be sufficiently exhibited on the surface, which may be problematic. However, according to the present disclosure, there may be an advantage in that additional additives such as a binder and a dispersant may not be necessary.

Meanwhile, washing by immersing the steel sheet on which the first graphene oxide layer is formed in an aqueous solution of pH 1 to 6 may be further included after the forming the first graphene oxide layer. Through this process, it may be preferable to remove excessively adsorbed graphene oxide. Since a method for preparing an aqueous solution having a pH of 1 to 6 is not limited to any particular example, a detailed description thereof will not be provided in the present disclosure.

Thereafter, forming a second graphene oxide layer having a negative charge on the first graphene oxide layer may be performed. The forming the second graphene oxide layer may be performed using a graphene oxide dispersion solution having a negative charge. The method for preparing the graphene oxide dispersion solution having a negative charge is not limited to any particular example, and for example, the graphene oxide dispersion solution having a negative charge may be prepared by treating by at least one method selected from ultraviolet-ozone (UV-Ozone) irradiation, electron beam (EB) irradiation, infrared (IR) irradiation, and near-infrared (NIR) irradiation.

As described above, the graphene oxide dispersion solution for forming the second graphene oxide layer may not include a binder and a dispersant. Since the solution including the binder may be merely a mixture of the binder and graphene, there may be a problem in dispersion stability of graphene. Accordingly, there may be a problem in that, to well disperse grapheme, a binder having sufficient bonding strength may need to be selected, and also, there may be a problem that, to obtain a sufficient dispersion effect, a dispersant not adversely affecting physical properties of the coating composition may need to be appropriately selected. According to the present disclosure, it may be preferable that no additional additives such as a binder and a dispersant are necessary.

Also, after the forming the second graphene oxide layer, the method may further include washing by immersing the steel sheet on which the second graphene oxide layer is formed in an aqueous solution of pH 8 to 14. Through this process, it may be preferable to remove excessively adsorbed graphene oxide. A method for preparing an aqueous solution having a pH of 8 to 14 is not limited to any particular example, and thus, a detailed description thereof will not be provided in the present disclosure.

As such, since the first and second graphene oxide layers have different charges, the first and second graphene oxide layers may be formed through self-assembly through electrostatic interaction. In this case, the forming the first graphene oxide layer and the forming the second graphene oxide layer may be repeatedly performed two or more times, and may be repeatedly performed two to 50 times preferably. Accordingly, by adjusting the thickness of the graphene coating layer as desired, physical properties of the coated steel sheet may be differentiated, such that the method may be usefully applied according to a desired purpose.

Thereafter, by heat-treating the steel sheet on which the first and second graphene oxide layers are formed, a graphene-coated steel sheet may be manufactured. The heat treatment may be performed at 100 to 400° C., more preferably at 200 to 300° C. By the heat treatment, a carboxyl group included in a graphene oxide layer having a negative charge and an amine group included in a graphene oxide layer having a positive charge may react such that an amide bond may be formed, thereby significantly increasing the interlayer bonding force. Also, as the graphene oxide is reduced to graphene through the heat treatment process, a coating layer which may further exhibit excellent properties of grapheme may be formed.

Meanwhile, according to another aspect of the present disclosure, a graphene-coated steel sheet manufactured by the above-described method may be provided. The graphene-coated steel sheet according to the present disclosure may be formed through self-assembly by electrostatic interaction, such that the steel sheet may have excellent orientation, which may be an advantage.

Also, the thickness of the coating layer formed on the steel sheet is not limited to any particular example, and may be adjusted depending on the use, and may preferably be 0.5 µm to 5.0 µm. When it is less than 0.5 µm, corrosion resistance may be deteriorated because the coating thickness may be too thin to exhibit a sufficient barrier effect, and when it is more than 5.0 µm, adhesion strength with the steel sheet may be deteriorated.

As such, according to the present disclosure, through a simplified process using electrostatic attraction between graphene oxide having a negative charge and graphene oxide having a positive charge without a special dispersant or binder, the method may be easily applied to large-area coating such as a steel sheet, and graphene of a large size may be applied to large-area coating such as coating on a steel sheet, such that excellent physical properties of graphene may be exhibited efficiently. Furthermore, by adjusting the thickness of the laminated graphene layers and the number of the laminated graphene layers as desired, physical properties of the coated steel sheet may be differentiated such that the present disclosure may be usefully applied according to a desired purpose.

Mode for Invention

Hereinafter, the present disclosure will be described in greater detail through specific embodiments. The embodiments as below are merely examples to help the understanding of the present disclosure, and the scope of the present disclosure is not limited thereto.

Embodiment

By performing UV-ozone treatment on a hot-dip galvanized steel sheet for 30 minutes, the surface of the steel sheet was modified to have a negative charge.

Thereafter, graphene oxide was dispersed in water in a content of 0.5 mg/ml, N-ethyl-N'-(3-dimethylaminopropyl) carbodiimidemethiodide (EDC) and ethylenediamine (EDA) were added to the aqueous solution in an amount of 0.01 to 3.0 mg/ml and 0.05 to 3.0 mg/ml, respectively, and reacted for 4 hours, thereby preparing a graphene oxide dispersion solution modified with an amine group.

FIG. 2A is a result of XPS measurement of graphene oxide used in the experiment, FIG. 2B is a result of XPS measurement of graphene oxide after dispersing a graphene oxide in a water, and reacting N-ethyl-N'-(3-dimethylaminopropyl) carbodiimidemethiodide (EDC) and ethylenediamine (EDA) in the aqueous solution. Thereby, it may be confirmed that C—N, O=C—NH peaks, which had not been observed in FIG. 2A, were generated, and this bond was made by reacting ethylenediamine with a carboxyl group of graphene, and accordingly, graphene oxide was modified with an amine group.

The surface-modified steel sheet was immersed in the graphene oxide dispersion solution modified with an amine group for 1 minute and was taken out. The graphene oxide dispersion solution modified with an amine group was adsorbed to the steel sheet, and was immersed in an aqueous solution of pH 3 for 1 minute and was taken out, and the graphene oxide excessively adsorbed to the surface was removed.

Thereafter, the steel sheet was immersed in the graphene oxide dispersion solution (pH 10, 0.5 mg/ml) having a negative charge, prepared through UV-ozone treatment, for 1 minute and was taken out, and the graphene oxide was absorbed to the steel sheet. Thereafter, the steel sheet was immersed in an aqueous solution of pH 10 for 1 minute and was taken out such that graphene oxide excessively adsorbed to the surface was removed.

The adsorption of graphene oxide as above on the surface-modified steel sheet was one cycle, and the cycle was repeatedly performed, thereby forming graphene coating, and to identify whether the graphene coating was well performed, a contact angle of the coating layer was measured using a contact angle measuring instrument, and was exhibited in FIG. 3A. Referring to FIG. 3A, it may be observed that the contact angle of the film was repeatedly changed every time each layer was coated, and thereby, it is indirectly confirmed that graphene oxide was coated by electrostatic interaction by the LBL method.

Also, changes in thickness of the coating layer were measured using an ellipsometer for each cycle of the LBL process, and are illustrated in FIG. 3B. Referring to FIG. 3B, it was confirmed that the thickness was increased by about 1.9 nm in thickness every time one cycle as performed, and it may be confirmed that the increases were similar when each cycle was repeatedly performed. Thereby, it may be confirmed that graphene oxide was coated by electrostatic interaction through the LBL method along with the results of contact angle experiment.

Thereafter, the steel sheet was heat-treated at a temperature of 200° C. for 10 to 60 minutes, thereby manufacturing a graphene-coated steel sheet. To observe the chemical structure changed after the heat treatment, XPS analysis was performed and is illustrated in FIG. 4.

As a result, it may be indicated that the peak of the C—O, C=O bond decreased after heat treatment through FIGS. 4A and 4B, and thereby, it may be confirmed that graphene oxide was reduced.

Additionally, IR measurement was performed on the steel sheet to confirm the formation of amide bond. As a result of measuring IR, it was confirmed that a peak indicating an amide bond was observed, although not as large as in FIG. 5.

Meanwhile, FIG. 6A is a cross-section of the graphene-coated steel sheet before heat treatment, and FIG. 6B is an SEM image of a cross-section of the graphene-coated steel sheet after heat treatment. Referring to FIG. 6, it is indicated that the coating thickness before heat treatment was 1.3 μm, and graphenes were laminated layer by layer, and particularly, since a polymer was added in a very small amount and surrounded graphene oxide, a film formed of almost only graphene oxide was observed. Also, it may also be observed that the graphene oxide was present as a sheet with excellent orientation layer by layer. This thin film was heat-treated at 200° C., and the cross-section was observed again by SEM, and according to a result, the thickness decreased to 400 nm due to the reduction of graphene oxide, and the distance between graphenes was further decreased than before reduction heat treatment, had a dense structure, and had excellent orientation.

While the embodiments have been illustrated and described above, it will be apparent to those skilled in the art that modifications and variations could be made without departing from the scope of the present disclosure as defined by the appended claims.

The invention claimed is:

1. A method for manufacturing a graphene-coated steel sheet, the method comprising:
    surface-modifying a steel sheet to have a negative charge;
    forming a first graphene oxide layer having a positive charge on the surface-modified steel sheet;
    forming a second graphene oxide layer having a negative charge on the first graphene oxide layer; and
    heat-treating the steel sheet on which the first and second graphene oxide layers are formed,
    wherein the graphene-coated steel sheet comprises a coating layer coated on the steel sheet,
    wherein the coating layer comprises the first graphene oxide layer and the second graphene oxide layer, and
    wherein the coating layer has a thickness of 0.5 μm to 5.0 μm.

2. The method of claim 1, wherein the surface-modifying is performed by at least one method selected from ultraviolet-ozone (UV-Ozone) irradiation, electron beam (EB) irradiation, infrared (IR) irradiation, and near-infrared (NIR) irradiation.

3. The method of claim 1, wherein the forming the first graphene oxide layer is performed using a graphene oxide dispersion solution modified with an amine group.

4. The method of claim 3, wherein the graphene oxide dispersion solution modified with an amine group is prepared by reacting graphene oxide, N-ethyl-N'-(3-dimethylaminopropyl)carbodiimidemethiodide (EDC) and $C_1$ to $C_6$ alkylenediamine in water.

5. The method of claim 3, wherein the graphene oxide dispersion solution modified with an amine group does not comprise a binder and a dispersant.

6. The method of claim 1, wherein the forming the second graphene oxide layer is performed using a graphene oxide dispersion solution treated by at least one method selected from ultraviolet-ozone (UV-Ozone) irradiation, electron beam (EB) irradiation, infrared (IR) irradiation, and near-infrared (NIR) irradiation.

7. The method of claim 6, wherein the graphene oxide dispersion solution does not comprise a binder and a dispersant.

8. The method of claim 1, wherein the first and second graphene oxide layers are laminated through electrostatic interaction.

9. The method of claim 1, wherein the first and second graphene oxide layers have an amide bond.

10. The method of claim 1, wherein the forming the first graphene oxide layer and the forming the second graphene oxide layer are performed two or more times repeatedly.

11. The method of claim 1, wherein the heat treatment is performed in a temperature range of 100 to 400° C.

12. The method of claim 1, wherein the method further comprises washing using an aqueous solution of pH 1 to 6 after the forming the first graphene oxide layer.

13. The method of claim 1, wherein the method further comprises washing using an aqueous solution of pH 8 to 14 after the forming the second graphene oxide layer.

14. The method of claim 1, wherein the surface-modifying is performed by at least one method selected from ultraviolet-ozone (UV-Ozone) irradiation, infrared (IR) irradiation, and near-infrared (NIR) irradiation.

* * * * *